United States Patent
Eicher et al.

(10) Patent No.: US 9,641,384 B1
(45) Date of Patent: *May 2, 2017

(54) AUTOMATED MANAGEMENT OF COMPUTING INSTANCE LAUNCH TIMES

(71) Applicant: Amazon Technologies, Inc., Reno, NV (US)

(72) Inventors: Anton André Eicher, Cape Town (ZA); Matthew James Eddey, Seattle, WA (US); Richard Alan Hamman, Cape Town (ZA)

(73) Assignee: Amazon Technologies, Inc., Seattle, WA (US)

( * ) Notice: Subject to any disclaimer, the term of this patent is extended or adjusted under 35 U.S.C. 154(b) by 114 days.

This patent is subject to a terminal disclaimer.

(21) Appl. No.: 14/482,914

(22) Filed: Sep. 10, 2014

(51) Int. Cl.
*G06F 7/04* (2006.01)
*H04L 12/24* (2006.01)

(52) U.S. Cl.
CPC .......... *H04L 41/0686* (2013.01); *H04L 41/50* (2013.01)

(58) Field of Classification Search
None
See application file for complete search history.

(56) References Cited

U.S. PATENT DOCUMENTS

| | | | | |
|---|---|---|---|---|
| 7,054,943 B1 * | 5/2006 | Goldszmidt | ............ | G06F 9/505 370/231 |
| 7,912,956 B1 * | 3/2011 | Williams | .............. | G06F 9/5083 709/223 |
| 2004/0105392 A1 * | 6/2004 | Charcranoon | ...... | H04L 41/5003 370/252 |
| 2008/0209429 A1 * | 8/2008 | Van Riel | ................. | G06F 9/505 718/104 |
| 2008/0270313 A1 * | 10/2008 | Cullen | ................... | G06Q 10/06 705/80 |
| 2010/0325191 A1 * | 12/2010 | Jung | ....................... | G06F 15/16 709/202 |
| 2011/0214124 A1 * | 9/2011 | Ferris | ....................... | G06F 8/63 718/1 |
| 2012/0123825 A1 * | 5/2012 | Biran | ................. | G06Q 10/0637 705/7.36 |
| 2013/0060839 A1 * | 3/2013 | Van Biljon | ............ | G06Q 30/04 709/203 |

(Continued)

*Primary Examiner* — Farid Homayounmehr
*Assistant Examiner* — Olanrewaju Bucknor
(74) *Attorney, Agent, or Firm* — Thorpe North & Western LLP

(57) ABSTRACT

Technology is described for monitoring computing instance launch times. A launch plan for launching a computing instance in a computing service environment may be identified. A predicted launch time for launching the computing instance on a selected physical host in the computing service environment may be determined using a launch time prediction model. An actual launch time for launching the computing instance in the computing service environment may be identified. The predicted launch time that is determined using the launch time prediction model may be compared with the actual launch time for launching the computing instance in the computing service environment. The actual launch time may be determined as not being within a defined threshold of the predicted launch time. An alert may be generated to indicate that the actual launch time is not within the defined threshold of the predicted launch time.

18 Claims, 8 Drawing Sheets

(56) References Cited

U.S. PATENT DOCUMENTS

| | | | |
|---|---|---|---|
| 2013/0060933 A1* | 3/2013 | Tung | G06F 11/3495 709/224 |
| 2013/0139152 A1* | 5/2013 | Chang | G06F 9/45545 718/1 |
| 2014/0040473 A1* | 2/2014 | Ho | G06F 9/5072 709/226 |
| 2014/0089509 A1* | 3/2014 | Akolkar | H04L 41/147 709/226 |
| 2015/0106805 A1* | 4/2015 | Melander | G06F 9/45537 718/1 |

\* cited by examiner

AUTOMATED MANAGEMENT OF COMPUTING INSTANCE LAUNCH TIMES

BACKGROUND

The advent of virtualization technologies for computing resources has provided benefits with respect to managing large-scale computing resources for many customers with diverse needs. In addition, virtualization technologies have allowed various computing resources or computing services to be efficiently and securely shared by multiple customers. For example, virtualization technologies may allow a single physical host (e.g., a single physical computing machine) to be shared among multiple customers by providing each customer with one or more computing instances hosted by the single physical host using a hypervisor. A computing instance may be a guest machine acting as a distinct logical computing system that provides a customer with the perception that the customer is the sole operator and administrator of a given virtualized hardware computing resource.

A request to launch a computing instance may entail identifying available computing resources (e.g., a computing slot in a hypervisor) on which the computing instance may be executed. For example, one or more physical hosts (e.g., server computers or physical computing machines) may be queried to determine whether sufficient computing resources exist on a physical computing machine to launch and execute a computing instance and whether a physical host meets additional specified criteria (e.g., disaster mitigation criteria, licensing criteria, etc.) for the group of physical hosts. In a case where a physical host is identified as having computing resources available to execute the computing instance and meeting the specific criteria, the computing instance may be launched on the physical host, and a customer may be notified that the computing instance has been launched.

DETAILED DESCRIPTION

Figure 1:
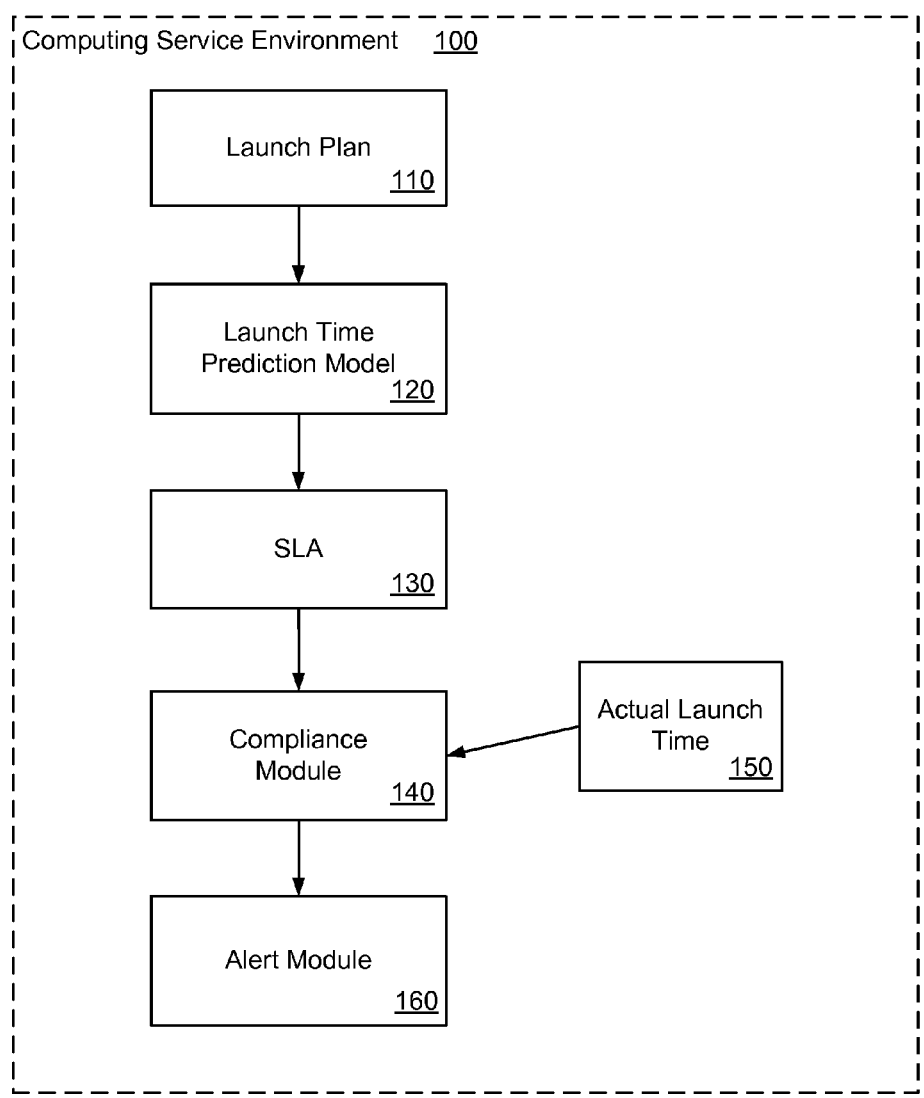
FIG. 1 illustrates a system and related operations for generating an alert when a computing instance's actual launch time does not comply with a service level agreement (SLA) according to an example of the present technology.

Technology is described for monitoring a computing instance launch time and generating an alert if the computing instance launch time does not comply with a target launch time. A plan to launch a computing instance in a computing service environment may be received. For example, the plan may be received from a customer who desires computing services from the computing service environment. A physical host, also known as a server computer, having available computing slots (e.g., computing resources used to launch the computing instance) or a group of physical hosts in the computing service environment may be selected to launch or execute the computing instance. The physical host may be selected using a number of placement factors, such an amount of time to launch the computing instance on the physical host, physical host utilization, licensing costs, disaster impact, etc.

In one example, a predicted launch time for launching the computing instance on the selected physical host may be determined using a launch time prediction model. The term "launch time" may generally refer to a period of time between 1) receiving the plan to launch the computing instance and 2) booting the computing instance on the physical host that is selected to launch the computing instance. The launch time prediction model may be a machine learning model (e.g., a regression model) that has been trained using historical launch time information and features for a plurality of previously launched computing instances in order to predict the predicted launch time for the computing instance to be launched in the computing service environment. The launch time prediction model may determine the predicted launch time using instance features associated with the computing instance to be launched and physical host features associated with the physical host selected to launch the computing instance.

The instance features may describe or characterize the computing instance to be launched in the computing service environment. For example, the instance features may include, but are not limited to, a size of the computing instance (e.g., memory or processor size), a type of machine image used by the computing instance (e.g., a machine image or a kernel image), an architecture type of the computing instance (e.g., a 32-bit architecture or a 64-bit architecture), a virtualization type of the computing instance (e.g., paravirtualization or a hardware virtual machine), and a type of data store used by the computing instance. The instance features may include user-controlled features, such as a type of operating system (OS) and a networking type (e.g., virtual private network) used for launching the computing instance.

The physical host features may describe or characterize aspects of the physical host that is selected to launch the computing instance. The physical host features may include, but are not limited to, a maximum number of computing instances that can be hosted at the physical host, a hardware type associated with the physical host, a hardware vendor associated with the physical host, a percentage occupancy for computing instances at the physical host when the computing instance is to be launched and a zone in which the physical host is located. In addition, the physical host features may include a number of computing instances that are currently pending and/or a running on the physical host.

The predicted launch time may be used to generate the target launch time for launching the computing instance. In one example, the target launch time may be used to generate a service level agreement (SLA), which may define acceptable launch times for launching the computing instance. In other words, the SLA may be a dynamic SLA that varies depending on the predicted launch time, as opposed to a static SLA that is fixed for a certain period of time between the customer and the computing service provider. In other words, the predicted launch time may be dynamically used to generate the SLA for the customer (e.g., the predicted launch time may dynamically become the SLA for the customer). The SLA may be an agreement between the customer providing a plan for the computing instance to be launched and a computing service provider that may launch the computing instance. In one example, the SLA may specify that an actual launch time for launching the computing instance is to be within a predefined time period (e.g., 20 seconds) of the predicted launch time. In other words, the actual launch time may be acceptable when within a predefined time window surrounding the predicted launch time. As a non-limiting example, the SLA may specify that the actual launch time for launching the computing instance is to be less than 90 seconds when the predicted launch time for launching the computing instance is 70 seconds. In another example, the SLA may specify that the actual launch time is not to be greater than a predefined percentage (e.g., 15%) of the predicted launch time. Alternatively, the SLA may specify that the actual launch time for launching the computing instance is to be substantially similar to the predicted launch time.

In one example, the actual time for launching the computing instance may be compared with the SLA. If the actual launch time complies with the SLA, then systems in the computing service environment may be assumed to be operating properly. If the actual launch time does not comply with the SLA, an alert may be generated to indicate potential service failures in the computing service environment. In other words, since the actual launch time for the computing instance is slower than expected (i.e., slower than similar computing instances that were previously launched in the computing service environment), the relatively slow launch time may be caused by the potential service failures in the computing service environment. The alert may be provided to a response team that is responsible for investigating and/or resolving the potential service failures in the computing service environment. The potential service failures causing delays in launch times may be identified and subsequently resolved in order to ensure that actual launch times are compliant with the SLA.

FIG. 1 illustrates a system and related operations for generating an alert when a computing instance launch time is not in accordance with a service level agreement (SLA). A launch plan 110 for launching a computing instance may be received from a customer desiring computing services from a computing service environment 100. The computing instance may be considered for placement onto a physical host in the computing service environment 100 that has available computing slots to launch the computing instance. Instance features associated with the computing instance plan and physical host features associated with the physical host selected to potentially launch the computing instance may be identified. The instance features and the physical host features may be provided to a launch time prediction model 120. The launch time prediction model 120 may predict a predicted launch time for launching the computing instance on the selected physical host.

The predicted launch time may be used to generate a service level agreement (SLA) 130 that defines acceptable launch times for launching the computing instance in the computing service environment 100. In other words, the SLA 130 may be a target launch time for launching the computing instance. For example, the SLA 130 may specify that an actual launch time 150 for the computing instance that is within 2 minutes of the predicted launch time is acceptable. A compliance module 140 may compare the SLA 130 with the actual launch time 150 for the computing instance. In other words, the compliance module 140 may determine whether the actual launch time 150 complies with the SLA 130. An alert module 160 may generate an alert indicating potential service failure in the computing service environment 100 when the actual launch time 150 does not comply with the SLA 130. The alert module 160 may provide the alert to a response team that is responsible for investigating and/or resolving potential service failures in the computing service environment 100.

Figure 2:
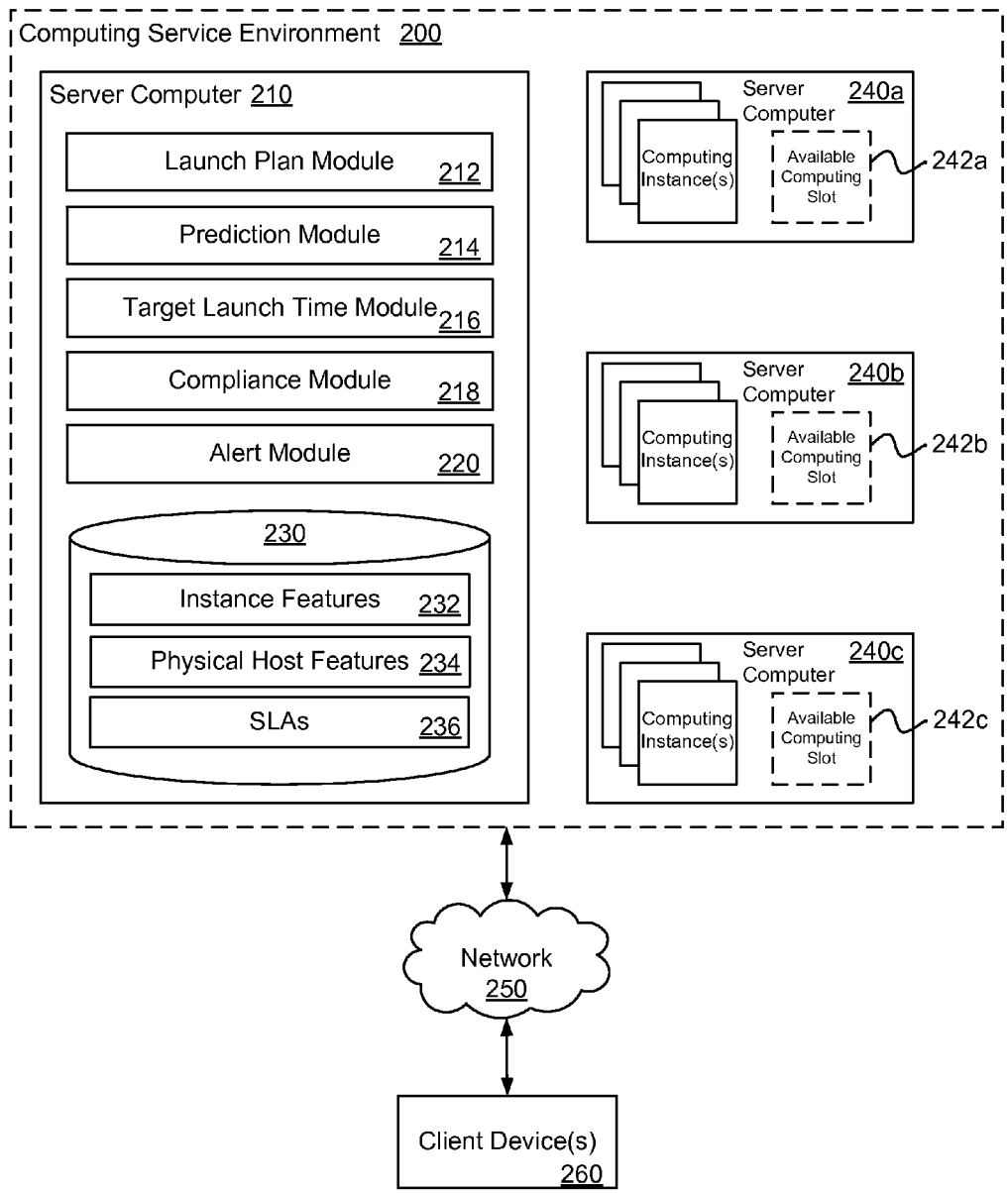
FIG. 2 is a block diagram that illustrates various components included in a system for generating an alert when a computing instance's actual launch time does not comply with a service level agreement (SLA) according to an example of the present technology.

FIG. 2 illustrates components of an example computing service environment 200 according to one example of the present technology. The computing service environment 200 may include a server computer 210 in communication with a number of client devices 260 via a network 250, and the server computer may be part of the control plane for the computing service environment 200. The server computer 210 may contain a data store 230 and a number of modules used to monitor computing instance launch times and generate an alert when a computing instance launch time does not comply with a service level agreement (SLA) that has been dynamically created. In addition, the computing service environment 200 may include a number of server computers 240a-c executing a plurality of computing instances. The server computers 240a-c may communicate using a virtual network that is an overlay on an actual computing service network.

The server computers 240a-c may have available computing slots 242a-c (e.g., idle computing resources) that may be used to execute a computing instance. The available computing slots 242a-c may be allocated to customers who may then utilize an available computing slot 242a-c to execute a computing instance. Examples of computing instances may include on-demand computing instances, reserved computing instances and interruptible computing instances. An on-demand computing instance may be a computing instance that a customer may purchase and execute upon request. A reserved computing instance may be a reservation for a computing instance that a customer may purchase for a defined period of time making the computing instance available when the customer requests the computing instance, and an interruptible computing instance may be a computing instance that may be executed in a computing slot 242a-c not being used by another computing instance type unless the price being paid for the interruptible computing instance falls below a current bid price.

The data stored in the data store 230 may include instance features 232. The instance features 232 may be associated with the computing instance to be launched in the computing service environment 200. In addition, the instance features 232 may be associated with a machine image from which the computing instance is to be launched in the computing service environment 200. The instance features 232 may describe or characterize the computing instance that is to be launched in the computing service environment 200. For example, the instance features may have numerical values or other scalar values.

The data stored in the data store 230 may include physical host features 234. The physical host features 234 may be associated with a physical host in the computing service environment 200 that is selected to launch the computing instance. In other words, the physical host features 234 may describe or characterize the physical host that is selected to launch the computing instance. For example, the physical host features 234 may have numerical values or other scalar values.

The data stored in the data store 230 may include service level agreements (SLAs) 236 that define acceptable launch times for computing instances. The SLA 236 may be an agreement between a customer requesting the computing instance to be launched and a computing service provider that is launching the computing instance. The SLA 236 may define a level of performance and/or services to be provided to the customer. The SLA 236 may be for a particular computing instance that is to be launched in the computing service environment 200. Alternatively, the SLA 236 may be for a particular customer that is launching computing instances in the computing service environment 200. In one example, the SLA 236 may be generated using a predicted launch time for launching the computing instance, and therefore, is a dynamic SLA that varies depending on the predicted launch time. In other words, the predicted launch time may be dynamically used to generate the SLA 236 for the customer, as opposed to a static SLA that is fixed for a certain period of time between the customer and the computing service provider. In another example, the SLA 236 may specify that an actual launch time for launching the computing instance is to be within a predefined time (e.g., 50 seconds) of the predicted launch time. Alternatively, the SLA 236 may specify that the actual launch time for launching the computing instance is to be substantially similar to the predicted launch time.

The server computer 210 may include a launch plan module 212, a prediction module 214, a target launch time module 216, a compliance module 218, an alert module 220, and other applications, services, processes, systems, engines, or functionality not discussed in detail herein. The launch plan module 212 may be configured to identify a launch plan for launching the computing instance in the computing service environment 200. The launch plan may be received from a customer who desires computing services from the computing service environment 200. In one example, the launch plan may be for launching multiple computing instances, and may indicate a type or size of the computing instances to be launched. In one example, the launch plan may specify a particular geographical region or zone to launch the computing instances.

The prediction module 214 may be configured to determine, using the launch time prediction model, a predicted launch time for launching the computing instance on a selected physical host in the computing service environment 200. The physical host to launch the computing instance may be selected using numerous placement factors, such as an amount of time to launch the computing instance on the physical host, physical host utilization, licensing costs, disaster impact, etc. The prediction module 214 may identify instance features associated with the computing instance indicated in the launch plan and physical host features associated with the physical host selected to launch the computing instance. The instance features may include the size of the computing instance, a machine image used to launch the computing instance, an architecture type of the computing instance, a virtualization type of the computing instance, a type of data store used by the computing instance, etc. In addition, the physical host features may include a maximum number of computing instances that can be hosted on the physical host, a hardware type, a hardware vendor, a percentage of occupancy, a geographical zone in which the physical host is located, a number of currently pending or running instances on the physical host, etc. The prediction module 214 may determine the predicted launch time for the computing instance, via the launch time prediction model, based on the instance features and the physical host features.

The target launch time module 216 may be configured to generate a target launch time for launching the computing instance in the computing service environment 200. In one example, the target launch time may be used to generate a dynamic service level agreement (SLA), which may define acceptable launch times for launching the computing instance. These dynamic SLAs may be tied to a specific launch plan for a single computing instance or group of computing instances, or the SLAs may last for a specific period of time, such as one hour, four hours, or six hours. The target launch time module 216 may generate the target launch time using the predicted launch time for launching the computing instance, as determined by the launch time prediction model. The target launch time module 216 may define the target launch time to be within a predefined time period or a predefined percentage of time with respect to the predicted launch time. As a non-limiting example, the target launch time module 216 may generate the target launch time to be within three minutes of the predicted launch time. Therefore, an actual launch time that exceeds the predicted launch time by one minute may be considered an acceptable launch time. As another non-limiting example, the target launch time module 216 may generate the target launch time as not being greater than 20% over the predicted launch time. Alternatively, the target launch time module 216 may generate the target launch time to be substantially similar to the predicted launch time.

The compliance module 218 may be configured to compare the actual time for launching the computing instance with the target launch time. The compliance module 218 may determine whether the actual launch time for launching the computing instance complies with the target launch time or is outside the target launch time. As a non-limiting example, the target launch time may specify that the computing instance is to be launched within 30 seconds of the predicted launch time. If the actual launch time is 120 seconds and the predicted launch time is 60 seconds, the compliance module 218 may determine that the actual launch time does not comply with the target launch time (i.e., the actual launch time is not acceptable). On the other hand, if the actual launch time is 50 seconds, the compliance module 218 may determine that the actual launch time complies with the target launch time (i.e., the actual launch time is acceptable). In general, actual launch times that are less than the predicted launch time may be considered to be compliant with the target launch time.

The alert module 220 may be configured to generate an alert when the actual launch time for launching the computing instance is not in accordance with the target launch time. The alert may indicate that a relatively slower launch time for the computing instance is due to potential service failures in the computing service environment 200. The alert module 220 may provide the alert to a quality control team or a system administrator that is responsible for investigating and/or resolving potential service failures in the computing service environment 200. As a result, computing instance launch times that are expected to take, for example, 30 seconds, but are taking two minutes, may be identified and potential service failures that are causing the relatively slow launch time may be resolved in the computing service environment 200. In addition, the alert module 220 may provide additional information to enable the potential service failures in the computing service environment 200 to be detected and subsequently resolved. For example, the additional information may include a type of computing instance that is launched, the physical host on which the computing instance is launched, a type of data store used when launching the computing instance, etc.

The client device 260 may be utilized by a customer to request a computing instance and to control an executing computing instance. The client device 260 may include any device capable of sending and receiving data over the network 250. The client device 260 may comprise, for example a processor-based system such as a computing device. The client device 260 may be a device such as, but not limited to, a desktop computer, laptop or notebook computer, tablet computer, mainframe computer system, handheld computer, workstation, network computer, or other devices with like capability.

The various processes and/or other functionality contained within the computing service environment 200 may be executed on one or more processors that are in communication with one or more memory modules. The computing service environment 200 may include a number of computing devices that are arranged, for example, in one or more server banks or computer banks or other arrangements. The computing devices may support a computing environment using hypervisors, virtual machine monitors (VMMs) and other virtualization software. The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

The network 250 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

Figure 3:
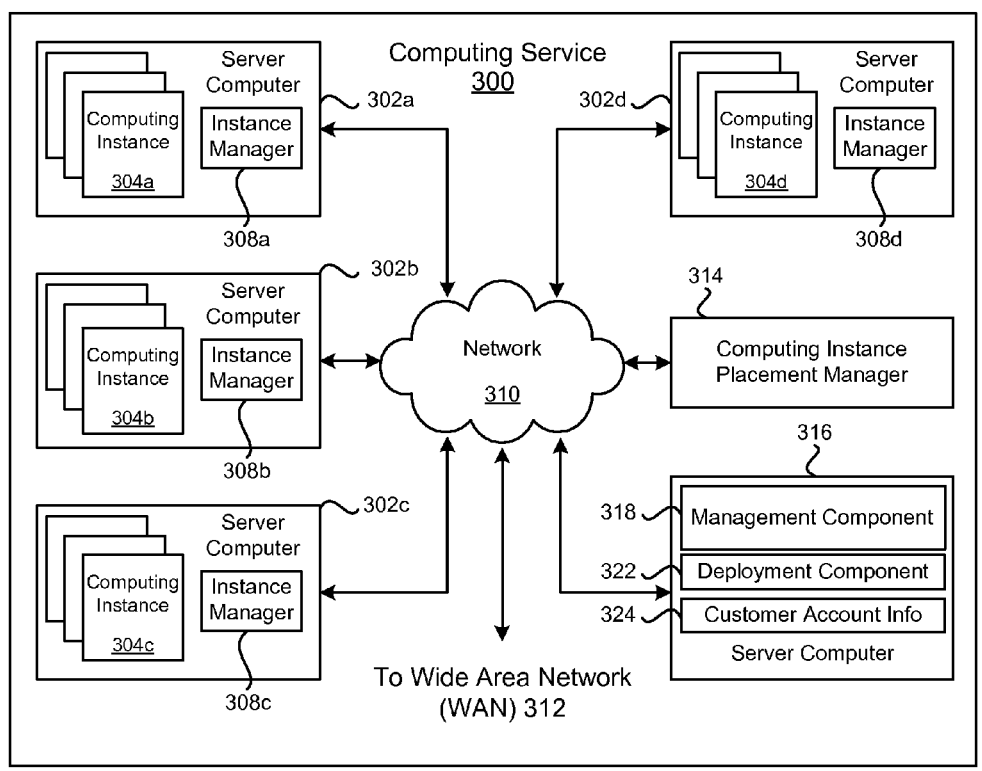
FIG. 3 is a block diagram of a computing service environment according to an example of the present technology.

FIG. 3 is a block diagram illustrating an example computing service 300 that may be used to execute and manage a number of computing instances 304a-d. In particular, the computing service 300 depicted illustrates one environment in which the technology described herein may be used. The computing service 300 may be one type of environment that includes various virtualized service resources that may be used, for instance, to host computing instances 304a-d.

The computing service 300 may be capable of delivery of computing, storage and networking capacity as a software service to a community of end recipients. In one example, the computing service 300 may be established for an organization by or on behalf of the organization. That is, the computing service 300 may offer a "private cloud environment." In another example, the computing service 300 may support a multi-tenant environment, wherein a plurality of customers may operate independently (i.e., a public cloud environment). Generally speaking, the computing service 300 may provide the following models: Infrastructure as a Service ("IaaS"), Platform as a Service ("PaaS"), and/or Software as a Service ("SaaS"). Other models may be provided. For the IaaS model, the computing service 300 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 300. End customers may access the computing service 300 using networked client devices, such as desktop computers, laptops, tablets, smartphones, etc. running web browsers or other lightweight client applications, for example. Those familiar with the art will recognize that the computing service 300 may be described as a "cloud" environment.

The particularly illustrated computing service 300 may include a plurality of server computers 302a-d. The server computers 302a-d may also be known as physical hosts. While four server computers are shown, any number may be used, and large data centers may include thousands of server computers. The computing service 300 may provide computing resources for executing computing instances 304a-d. Computing instances 304a-d may, for example, be virtual machines. A virtual machine may be an instance of a software implementation of a machine (i.e. a computer) that executes applications like a physical machine. In the example of a virtual machine, each of the server computers 302a-d may be configured to execute an instance manager 308a-d capable of executing the instances. The instance manager 308a-d may be a hypervisor, virtual machine monitor (VMM), or another type of program configured to enable the execution of multiple computing instances 304a-d on a single server. Additionally, each of the computing instances 304a-d may be configured to execute one or more applications.

One or more server computers 314 and 316 may be reserved to execute software components for managing the operation of the computing service 300 and the computing instances 304a-d. For example, a server computer 314 may execute a computing instance placement manager that may perform functions, such as querying the server computers 302a-d for available computing slots and computing group state information, as well as determining a placement of a computing instance 304a-d in an available computing slot. In addition, the server computer 314 may include functionality of the server computer 210.

A server computer 316 may execute a management component 318. A customer may access the management component 318 to configure various aspects of the operation of the computing instances 304a-d purchased by a customer. For example, the customer may setup computing instances 304a-d and make changes to the configuration of the computing instances 304a-d.

A deployment component 322 may be used to assist customers in the deployment of computing instances 304a-d. The deployment component 322 may have access to account information associated with the computing instances 304a-d, such as the name of an owner of the account, credit card information, country of the owner, etc. The deployment component 322 may receive a configuration from a customer that includes data describing how computing instances 304a-d may be configured. For example, the configuration may include an operating system, provide one or more applications to be installed in computing instances 304a-d, provide scripts and/or other types of code to be executed for configuring computing instances 304a-d, provide cache logic specifying how an application cache should be prepared, and other types of information. The deployment component 322 may utilize the customer-provided configuration and cache logic to configure, prime, and launch computing instances 304a-d. The configuration, cache logic, and other information may be specified by a customer accessing the management component 318 or by providing this information directly to the deployment component 322.

Customer account information 324 may include any desired information associated with a customer of the multi-tenant environment. For example, the customer account information may include a unique identifier for a customer, a customer address, billing information, licensing information, customization parameters for launching instances, scheduling information, etc. As described above, the customer account information 324 may also include security information used in encryption of asynchronous responses to API requests. By "asynchronous" it is meant that the API response may be made at any time after the initial request and with a different network connection.

A network 310 may be utilized to interconnect the computing service 300 and the server computers 302a-d, 316. The network 310 may be a local area network (LAN) and may be connected to a Wide Area Network (WAN) 312 or the Internet, so that end customers may access the computing service 300. The network topology illustrated in FIG. 3 has been simplified, as many more networks and networking devices may be utilized to interconnect the various computing systems disclosed herein.

Figure 4:
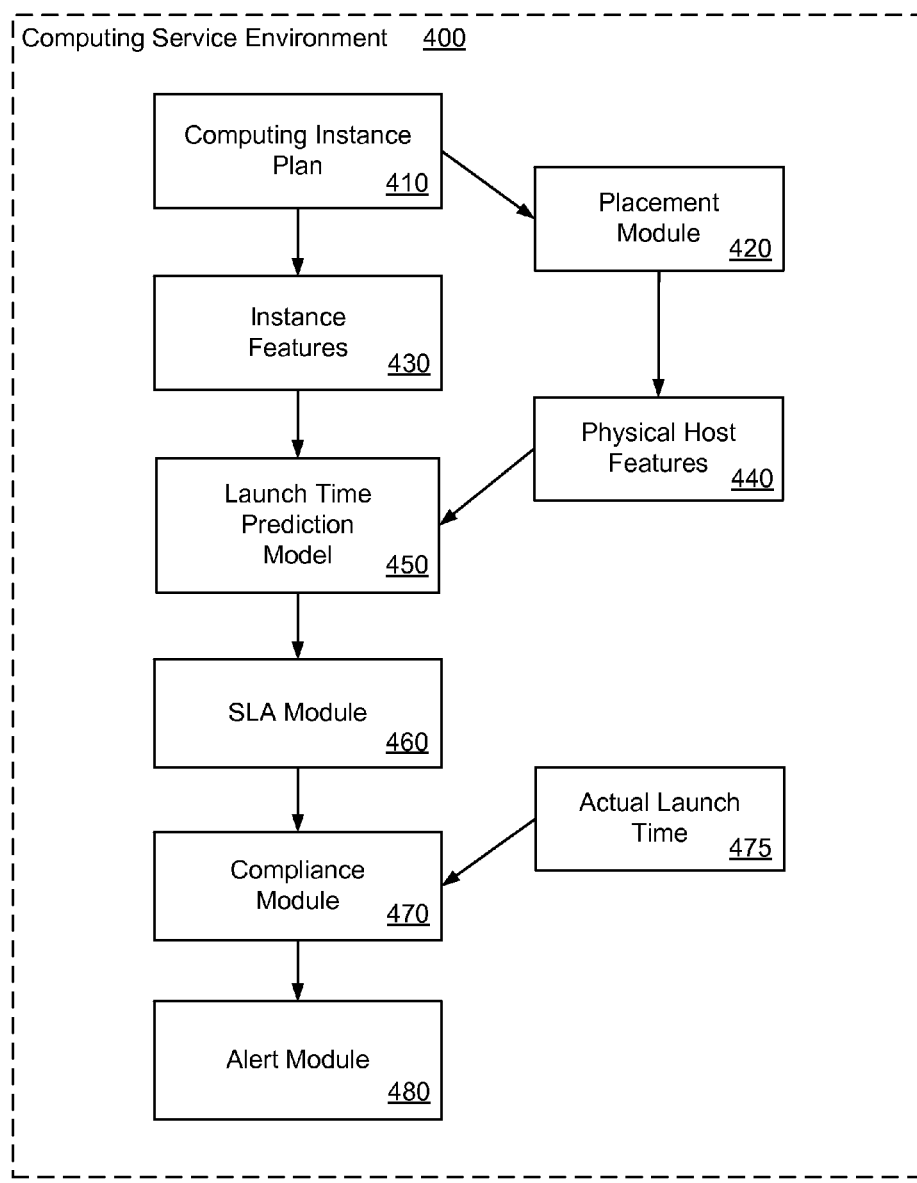
FIG. 4 illustrates a system and related operations for generating an alert when a computing instance's actual launch time does not comply with a service level agreement (SLA) according to an example of the present technology.

FIG. 4 illustrates a system and related operations for generating an alert when a computing instance launch time is not in accordance with a service level agreement (SLA). A computing instance plan 410 to launch a computing instance in a computing service environment 400 may be received. For example, the computing instance plan 410 may be received from a customer who desires computing services from the computing service environment 400.

A placement module 420 may select a physical host having available computing slots (e.g., computing resources used to launch the computing instance) or a group of physical hosts in the computing service environment 400 to launch or execute the computing instance. The placement module 420 may select the physical host using a number of placement factors, such as a predicted launch time placement factor, a physical host utilization placement factor, a licensing cost placement factor and a disaster impact placement factor. The predicted launch time placement factor may represent a predicted amount of time to launch the computing instance on a particular physical host. The physical host utilization placement factor may represent a predetermined objective of maximizing physical host utilization among the physical hosts included in the computing service environment 400. The licensing placement factor may represent a predetermined objective of minimizing software licensing costs associated with the placement of computing instances on the physical hosts included in the computing service environment 400. The disaster impact placement factor may represent a predetermined objective of minimizing an impact of computing service failure (e.g., physical host failure, rack failure, availability zone failure or hardware failure) on a customer's executing computing instances. The placement module 420 may assign a weighting value to each of the placement factors correlating to an importance level of a respective placement factor when determining placement for the computing instance.

In one example, instance features 430 associated with the computing instance to be launched may be identified. The instance features 430 may describe or characterize the computing instance to be launched in the computing service environment 400. For example, the instance features may include, but are not limited to, a size of the computing instance, a type of machine image used by the computing instance (e.g., a machine image or a kernel image), an architecture type of the computing instance (e.g., a 32-bit architecture or a 64-bit architecture), a virtualization type of the computing instance (e.g., paravirtualization or a hardware virtual machine), and a type of data store used by the computing instance. The instance features may include user-controlled features, such as a type of operating system (OS) and a networking type (e.g., virtual private network) used for launching the computing instance.

Physical host features 440 associated with the physical host selected to launch the computing instance may be identified. The physical host features 440 may describe or characterize aspects of the physical host that is selected to launch the computing instance. The physical host features 440 may include, but are not limited to, a maximum number of computing instances that can be hosted at the physical host, a hardware type associated with the physical host, a hardware vendor associated with the physical host, a percentage occupancy for computing instances at the physical host when the computing instance is to be launched and a zone in which the physical host is located. In addition, the physical host features 440 may include a number of computing instances that are currently pending and/or a running on the physical host.

The instance features 430 and the physical host features 440 may be provided to a launch time prediction model 450. The launch time prediction model 450 may be a regression model or another machine learning model that determines a predicted launch time for launching the computing instance on the selected physical host based on the instance features 430 and the physical host features 440. The launch time prediction model 450 may have been trained using historical information for previously launched computing instances (e.g., types of computing instances that were previously launched, launch times for the computing instances, the number of simultaneous launches on the physical hosts that launched the computing instances, etc.) in order to determine the predicted launch time for launching the computing instance.

As a non-limiting example of instance features, a computing instance to be launched in the computing service environment 400 may: be relatively small in size, consist of a 32-bit architecture, use a hardware virtual machine (HVM), and/or use a defined type of data store. The physical host that is selected to launch the computing instance may be 80% occupied (i.e., 80% of the computing resources for the physical host are currently being used) and is currently launching ten other computing instances. The launch time prediction model 450 may receive the identified features and determine that the predicted launch time for launching the computing instance on the physical host is 70 seconds.

A service level agreement (SLA) module 460 may receive the predicted launch time from the launch time prediction model 450. The SLA module 460 may generate an SLA that defines acceptable launch times for launching the computing instance. The SLA module 460 may determine the acceptable launch times (e.g., a maximum acceptable launch time) based on the predicted launch time received from the launch time prediction model 450. Thus, the SLA may dynamically vary depending on the predicted launch time for the computing instance. In one example, the SLA module 460 may generate the SLA to specify that an actual launch time 475 for launching the computing instance may be acceptable when within a predefined time period or a predefined percentage over the predicted launch time.

As a non-limiting example, the SLA module 460 may generate the SLA to specify that the actual launch time 475 is to be within 45 seconds of the predicted launch time. As another non-limiting example, the SLA module 460 may generate the SLA to specify that the actual launch time 475 is not to be greater than 15% over the predicted launch time. As yet another non-limiting example, the SLA module 460 may generate the SLA to specify that the actual launch time 475 for launching the computing instance is to be less than a maximum acceptable launch time of 35 seconds. Alternatively, the SLA module 460 may generate the SLA to specify that the actual launch time 475 for launching the computing instance is to be substantially similar to the predicted launch time.

In an alternative configuration, the computing instance plan 410 may be received from the customer. Instance features 430 and physical host features 440 for a plurality of physical hosts in the computing service environment 400 may be identified. The launch time prediction model 450 may determine predicted launch times for launching the computing instance on each of the plurality of physical hosts in the computing service environment 400. For example, the launch time prediction model 450 may determine a predicted launch time for launching the computing instance on physical host A, a predicted launch time for launching the computing instance on physical host B, a predicted launch time for launching the computing instance on physical host C, and so on. The launch time prediction model 450 may provide the predicted launch times to the placement module 420. The placement module 420 may select a particular physical host (e.g., physical host B) to launch the computing instance when the predicted launch time for that particular host is lower than the predicted launch times for the other physical hosts in the computing service environment 400. The placement module 420 may provide the predicted launch time to the SLA module 460. The SLA module 460 may define the SLA based on the predicted launch time for the computing instance.

A compliance module 470 may compare the actual launch time 475 for launching the computing instance with the acceptable launch times included in the SLA. In other words, the compliance module 470 may determine whether the actual launch time 475 for launching the computing instance complies with the SLA or does not comply with the SLA. As a non-limiting example, the SLA may specify that the computing instance is to be launched in less than 9 minutes based on the predicted launch time (i.e., an actual launch time of less than 9 minutes is an acceptable launch time). If the actual launch time 475 is 12 minutes, the compliance module 470 may determine that the actual launch time 475 does not comply with the SLA (i.e., the actual launch time 475 of 12 minutes is not an acceptable launch time).

An alert module 480 may generate an alert when the actual launch time 475 for launching the computing instance does not correspond with acceptable launch times (i.e. the actual launch time 475 is not in accordance with the SLA). The alert may indicate that the relatively slow launch time for the computing instance may be due to potential service failures in the computing service environment 400. The alert module 480 may provide the alert to a quality control team that is responsible for investigating and/or resolving potential service failures in the computing service environment 400 that are causing the slower launch time. As a result, a computing instance launch time that is expected to take, for example, 50 seconds, but took three minutes, may be identified and potential service failures that caused the slower launch time for the computing instance may be resolved in the computing service environment 400.

In one example, the alert module 480 may provide additional information to enable the potential service failures in the computing service environment 400 to be resolved. In other words, the additional information may enable detection of the potential service failures. For example, the additional information may include a type of computing instance that is launched, the physical host on which the computing instance is launched, a type of data store used when launching the computing instance, etc. The additional information may enable the quality control team to identify a particular physical host or a group of physical hosts, network connections, hardware components, etc. in the computing service environment 400 that are faulty and/or overloaded. By monitoring the computing instance launch times and generating alerts when actual launch times do not correspond with acceptable launch times, potential service problems that are causing delays in the computing service environment 400 may be identified and resolved in order to improve launch times.

In one configuration, the alert module 480 may notify the customer providing the computing instance plan 410 when the actual launch time 475 does not comply with the SLA. The alert module 480 may inform the customer of the potential service features that are causing the slower launch time. In addition, the alert module 480 may provide recommendations for the customer to adjust user-controlled features in order to improve computing instance launch times. The user-controlled features may include a type of operating systems (OS) and networking types (e.g., virtual private cloud) used for launching the computing instances.

Figure 5:
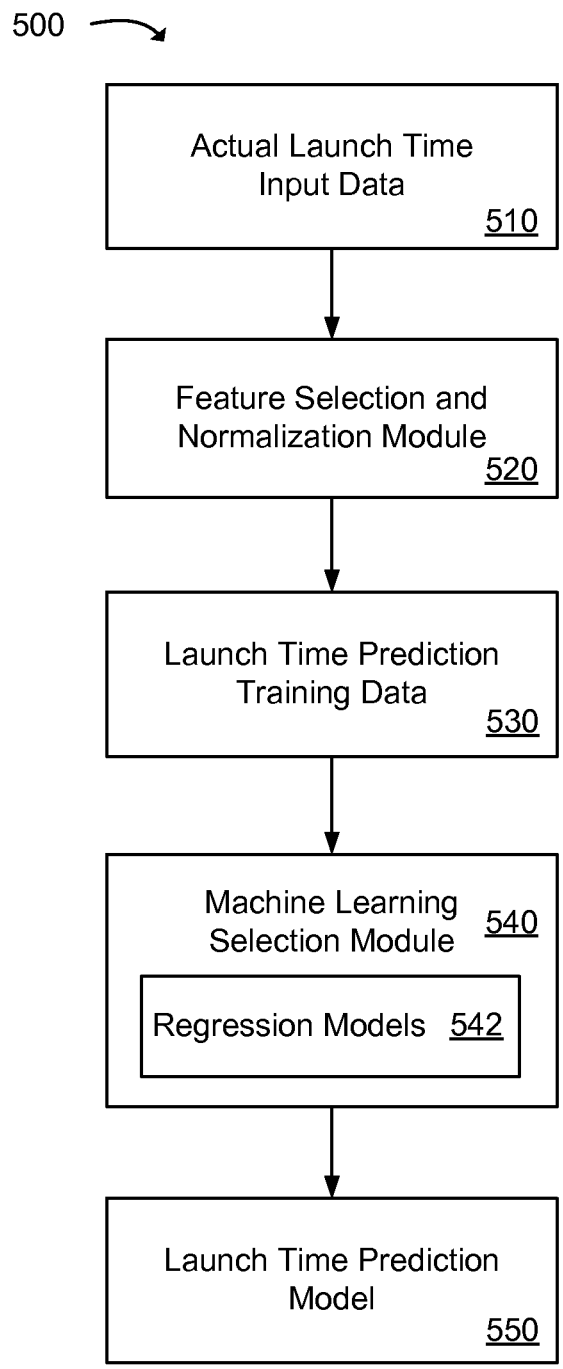
FIG. 5 is a block diagram that illustrates generating a machine learning model for predicting launch times for computing instances launched in a computing service environment according to an example of the present technology.

FIG. 5 is an exemplary block diagram 500 that illustrates generating a launch time prediction model 550 to predict launch times for computing instances that are launched in a computing service environment. The launch time prediction model 550 may be created using actual launch time prediction data 510. The actual launch time input data 510 may include information (e.g., launch metrics) for a plurality of computing instances that have been previously launched in the computing service environment. So, the actual launch time input data 510 may include historical information relating to previously launched computing instances in the computing service environment. In addition, the actual launch time input data 510 may include historical information for a plurality of physical hosts in the computing service environment. The actual launch time input data 510 may be transformed to be used to train the launch time prediction model 550, as discussed later.

As a non-limiting example, the actual launch time input data 510 may indicate that computing instance A took 60 seconds to launch, while computing instance A was relatively large in size, used a first type of data store, used a 32-bit architecture, and launched on a physical host that was simultaneously launching five other computing instances. As another non-limiting example, the actual launch time input data 510 may indicate that Computing Instance B took 15 seconds to launch, while Computing Instance B was relatively small in size, used a second type of data store, used a 64-bit architecture, and launched on a physical host that was not simultaneously launch other computing instances.

The actual launch time input data 510 may be provided to a feature selection and normalization module 520. The feature selection and normalization module 520 may convert the actual launch time input data 510 into model features. In other words, the model features may relate to characteristics of the computing instances that were previously launched and characteristics of the physical hosts upon which the computing instances were previously launched. The model features may be classified as instance features and physical host features.

The instance features may include, but are not limited to, sizes of the computing instances, machine images used by the computing instance (e.g., a machine images or kernel images), architecture types of the computing instances (e.g., 32-bit architectures or 64-bit architectures), virtualization types of the computing instances (e.g., paravirtualization or hardware virtual machines), and types of data stores used by the computing instances. The instance features may include user-controlled features, such as type of operating systems (OS) and networking types (e.g., virtual private cloud) used for launching the computing instances.

The physical host features may include, but are not limited to, a maximum number of computing instances the physical host can host, a hardware type associated with the physical host, a hardware vendor associated with the physical host, a percentage occupancy at the physical host when the computing instance is to be launched, and a zone in which the physical host is located. The physical host features may include an average, minimum and maximum number of pending computing instances and/or running computing instances on the physical host that launches the computing instance (i.e., a target physical host). In addition, the physical host features may include a number of computing instances that are currently in a pending state and/or a running state on the physical host that launches the computing instance (i.e., the target physical host).

The feature selection and normalization module 520 may normalize the model features (i.e., adjust values measured on different scales to a notionally common scale) in order to create launch time prediction training data 530. The launch time prediction training data 530 may represent aggregated features for the plurality of computing instances identified in the launch time prediction input data 510. The launch time prediction training data 530 may be provided to a machine learning selection module 540. The machine learning selection module 540 may use the launch time prediction training data 530 to train various machine learning models 542. For example, a regression model may be trained. The regression models 542 may include, but are not limited to, support vector machines, stochastic gradient descent, adaptive boosting, extra trees, and random forest. The various regression models 542 may correspond to the launch time prediction training data 530 with various levels of success. In one example, a random forest regressor may provide a relatively high rate of accuracy with respect to the launch time prediction training data 530, and therefore, the machine learning selection module 540 may use the random forest regressor when estimating launch times for computing instances.

The launch time prediction model 550 may receive a plan to launch a computing instance, and based on the instance features and the physical host features associated with the computing instance, the launch time prediction model 550 may predict the launch time for the computing instance. In one example, the launch time prediction model 550 may determine that the number of simultaneous computing instance launches on the same physical host, the type of data stored used by the computing instance, the architecture type used by the computing instance and a machine image associated with the computing instance may have a greater effect on the launch time for the computing instance as compared to the other model features.

In some cases, the predicted launch time from the computing instance may diverge from an actual launch time of the computing instance. The instance features and the physical host features associated with the computing instance, as well as the actual launch time to launch the computing instance, may be used to further train the launch time prediction model 550 in order to improve future launch time predictions.

Figure 6:
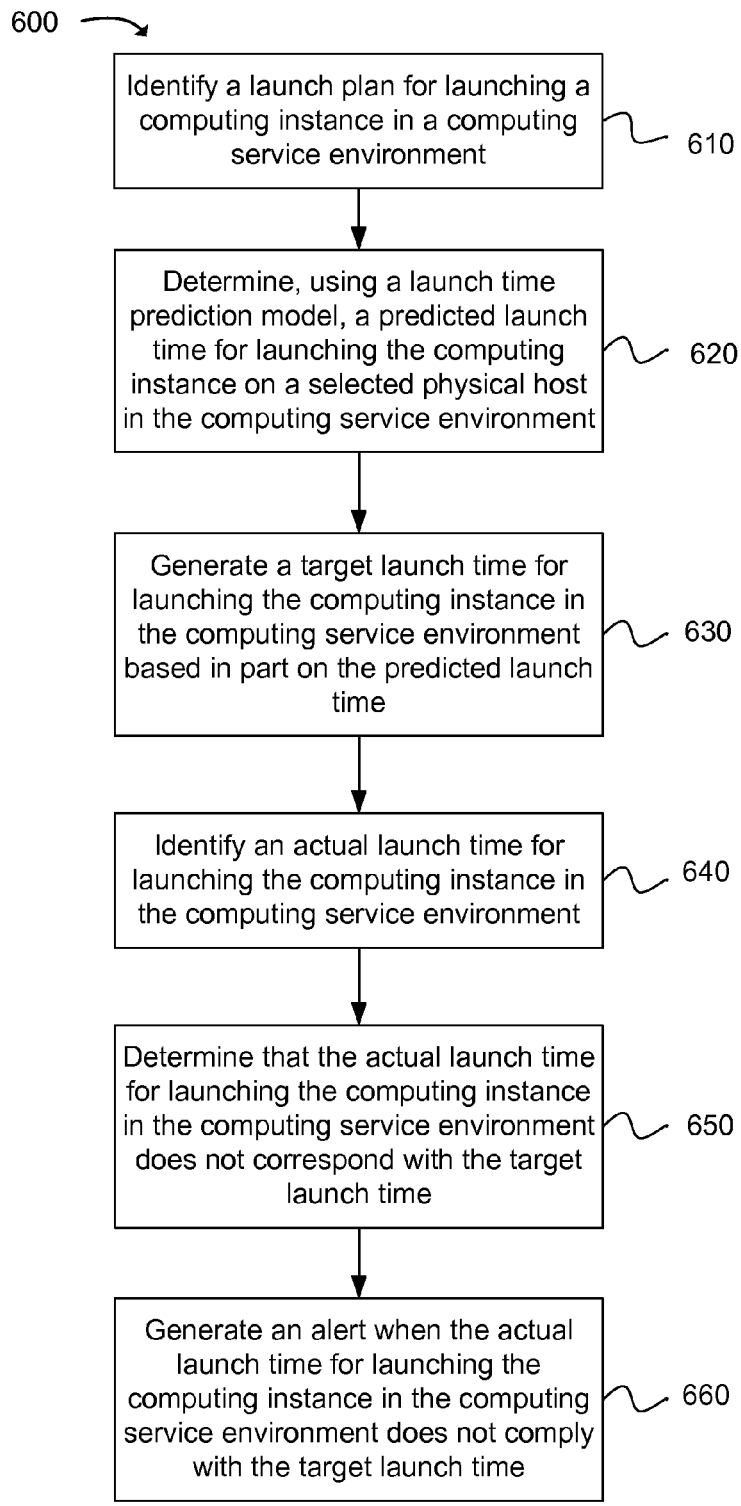
FIG. 6 is a flowchart of an example method for monitoring computing instance launch times.

FIG. 6 is a flowchart of an example method for monitoring computing instance launch times. A launch plan for launching a computing instance in a computing service environment may be identified, as in block 610. The launch plan for launching the computing instance may be received from a customer who desires computing services from the computing service environment.

A predicted launch time for launching the computing instance on a selected physical host in the computing service environment may be determined using a launch time prediction model, as in block 620. The launch time prediction model may be a machine learning model that determines the predicted launch time based on instance features associated with the computing instance and physical host features associated with the selected physical host in the computing service environment.

A target launch time for launching the computing instance in the computing service environment may be generated based in part on the predicted launch time, as in block 630. The target launch time may be used to generate a dynamic SLA that varies depending on the predicted launch time for launching the computing instance. As a non-limiting example, if the predicted launch time is five minutes, the SLA may indicate that an amount of time for launching the computing instance is to be less than seven minutes.

An actual launch time for launching the computing instance in the computing service environment may be identified, as in block 640. The actual launch time may refer to a period of time between receiving the plan to launch the computing instance and booting the computing instance on a physical host that is selected to launch the computing instance.

The actual launch time for launching the computing instance in the computing service environment may be determined to not comply with the target launch time, as in block 650. As a non-limiting example, an actual launch time of ten minutes may be considered an unacceptable launch time when the SLA indicates that the amount of time for launching the computing instance is to be less than seven minutes.

An alert may be generated when the actual launch time for launching the computing instance in the computing service environment does not comply with the target launch time, as in block 660. In one example, the alert may be provided to a system administrator to notify of potential service failures in the computing service environment that are to be resolved in order to improve computing instance launch times. In another example, a description of the computing instance that is launched may be provided to a system administrator to enable detection of potential service failures in the computing service environment.

Figure 7:
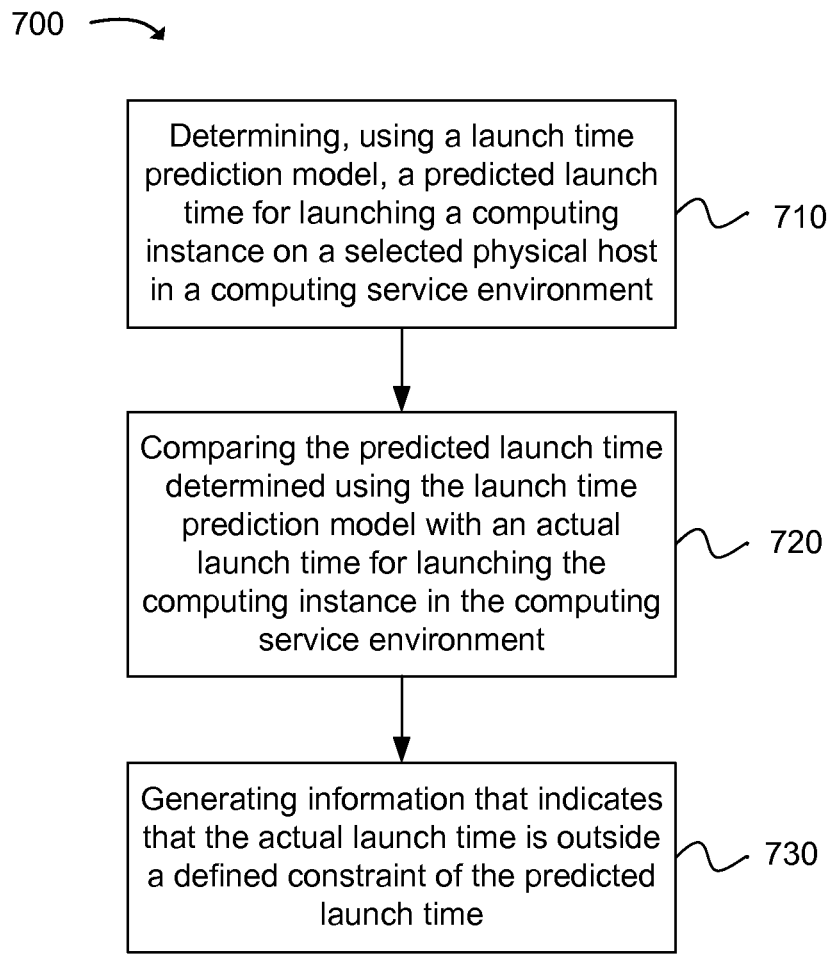
FIG. 7 is a flowchart of another example method for monitoring computing instance launch times.

FIG. 7 is a flowchart of another example method for monitoring computing instance launch times. A predicted launch time for launching a computing instance on a selected physical host in a computing service environment may be determined using a launch time prediction model, as in block 710. In one example, the launch time prediction model may be a machine learning model that determines the predicted launch time for launching the computing instance in the computing service environment based in part on instance features associated with the computing instance and physical host features associated with the selected physical host in the computing service environment. In addition, the launch time prediction model may be a regression model that determines the predicted launch time for launching the computing instance using historical information related to previously launched computing instances in the computing service environment. In one configuration, the launch time prediction model may use, in part, a feature representing a number of computing instances that are simultaneously being launched along with the computing instance on the selected physical host in the computing service environment when determining the predicted launch time for launching the computing instance.

The predicted launch time that is determined using the launch time prediction model may be compared with an actual launch time for launching the computing instance in the computing service environment, as in block 720. The actual launch time for launching the computing instance may be identified in response to executing the computing instance on the selected physical host in the computing service environment. As a non-limiting example, an actual launch time for launching the computing instance of 12 minutes may be compared with a predicted launch time for launching the computing instance of 5 minutes.

Information indicating that the actual launch time is outside a defined constraint of the predicted launch time may be generated, as in block 730. The defined constraint may be set by a computing service provider associated with the computing service environment. As a non-limiting example, the defined constraint may indicate that the actual launch time for launching the computing instance is not to exceed five minutes over the predicted launch time. Therefore, an actual launch time of 12 minutes may not be within the defined constraint when the predicted launch time is 5 minutes.

In one example, the information may be provided to a system administrator to enable potential service failures in the computing service environment to be detected and resolved in order to improve computing instance launch times. Alternatively, the information may be provided in order to create reporting metrics on computing instance launch times or to indicate that the launch time prediction model is to be retrained for improving accuracy of predicted launch times. In another example, additional information may be provided with the alert to enable potential service failures in the computing service environment to be resolved. The additional information may be related to at least one of: a type of computing instance that is launched in the computing service environment, the selected physical host in the computing service environment on which the computing instance is launched, or a type of data store used when launching the computing instance in the computing service environment.

In one configuration, a service level agreement (SLA) that defines acceptable launch times for launching the computing instance in the computing service environment may be generated based in part on the predicted launch time. The actual launch time for launching the computing instance may be compared with the acceptable launch times defined in the SLA. The alert may be generated when the actual launch time for launching the computing instance in the computing service environment is not in accordance with the SLA. In one example, the SLA may be a dynamic SLA that varies depending on the predicted launch time for launching the computing instance. In another example, the acceptable launch times for launching the computing instance defined in the SLA may be within a predefined time period of the predicted launch time. In yet another example, a notification may be provided to a customer when the actual launch time for launching the computing instance is in accordance with the SLA or is not in accordance with the SLA.

Figure 8:
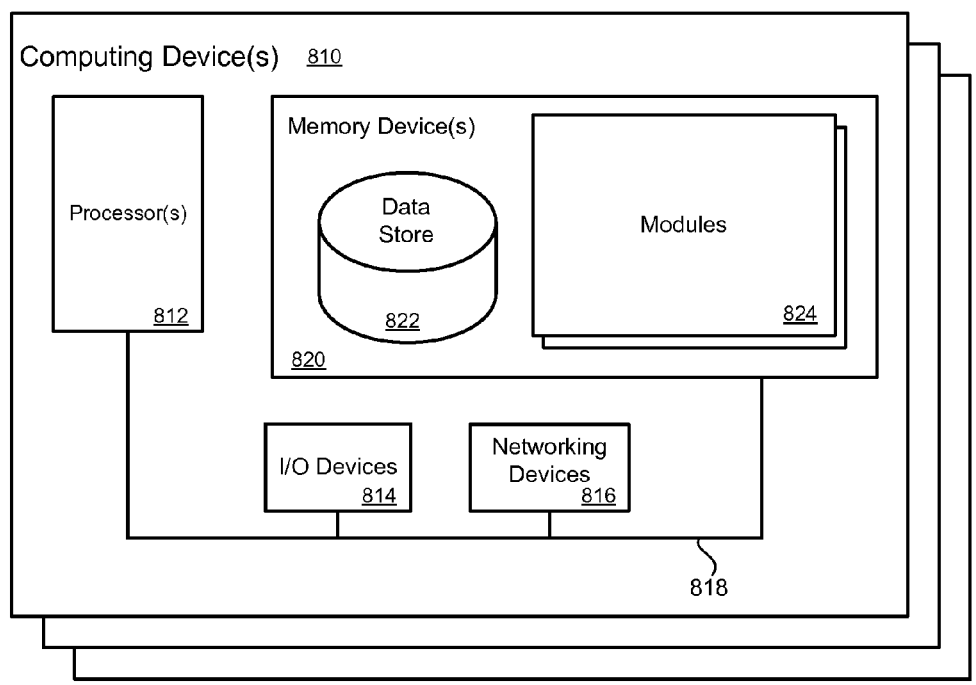
FIG. 8 is block diagram illustrating a computing device that may be employed in the present technology.

FIG. 8 illustrates a computing device 810 on which modules of this technology may execute. A computing device 810 is illustrated on which a high level example of the technology may be executed. The computing device 810 may include one or more processors 812 that are in communication with memory devices 820. The computing device may include a local communication interface 818 for the components in the computing device. For example, the local communication interface may be a local data bus and/or any related address or control busses as may be desired.

The memory device 820 may contain modules 824 that are executable by the processor(s) 812 and data for the modules 1324. The modules 824 may execute the functions described earlier. A data store 822 may also be located in the memory device 820 for storing data related to the modules 824 and other applications along with an operating system that is executable by the processor(s) 812.

Other applications may also be stored in the memory device 820 and may be executable by the processor(s) 812. Components or modules discussed in this description that may be implemented in the form of software using high programming level languages that are compiled, interpreted or executed using a hybrid of the methods.

The computing device may also have access to I/O (input/output) devices 814 that are usable by the computing devices. An example of an I/O device is a display screen that is available to display output from the computing devices. Other known I/O device may be used with the computing device as desired. Networking devices 816 and similar communication devices may be included in the computing device. The networking devices 816 may be wired or wireless networking devices that connect to the internet, a LAN, WAN, or other computing network.

The components or modules that are shown as being stored in the memory device 820 may be executed by the processor 812. The term "executable" may mean a program file that is in a form that may be executed by a processor 812. For example, a program in a higher level language may be compiled into machine code in a format that may be loaded into a random access portion of the memory device 820 and executed by the processor 812, or source code may be loaded by another executable program and interpreted to generate instructions in a random access portion of the memory to be executed by a processor. The executable program may be stored in any portion or component of the memory device 820. For example, the memory device 820 may be random access memory (RAM), read only memory (ROM), flash memory, a solid state drive, memory card, a hard drive, optical disk, floppy disk, magnetic tape, or any other memory components.

The processor 812 may represent multiple processors and the memory 820 may represent multiple memory units that operate in parallel to the processing circuits. This may provide parallel processing channels for the processes and data in the system. The local interface 818 may be used as a network to facilitate communication between any of the multiple processors and multiple memories. The local interface 818 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A non-transitory machine readable storage medium having instructions embodied thereon, the instructions being executed by a processor to cause a computer system to:
- identify a launch plan for launching a computing instance in a computing service environment;
- determine, using a launch time prediction model, a predicted launch time for launching the computing instance on a selected physical host in the computing service environment;
- generate a service level agreement (SLA) that defines acceptable launch times for launching the computing instance in the computing service environment based in part on the predicted launch time;
- identify an actual launch time for launching the computing instance in the computing service environment;
- comparing the actual launch time for launching the computing instance with the acceptable launch times defined in the SLA;
- determine that the actual launch time for launching the computing instance in the computing service environment does not comply with the SLA; and
- generate an alert when the actual launch time for launching the computing instance in the computing service environment does not comply with the SLA.

2. The non-transitory machine readable storage medium of claim 1, further comprising instructions that upon execution cause the computer system to: provide the alert to a system administrator to notify of potential service failures in the computing service environment to be resolved in order to improve computing instance launch times.

3. The non-transitory machine readable storage medium of claim 1, further comprising instructions that upon execution cause the computer system to: send a notification indicating potential service failures in the computing service environment to a system administrator.

4. A computer implemented method, comprising:
- under control of one or more computer systems configured with executable instructions:
- determining, using a launch time prediction model, a predicted launch time for launching a computing instance on a selected physical host in a computing service environment, using one or more processors of the computer systems;
- generating a service level agreement (SLA) that defines acceptable launch times for launching the computing instance in the computing service environment based in part on the predicted launch time;
- comparing an actual launch time for launching the computing instance in the computing service environment with the acceptable launch times defined in the SLA, using the one or more processors of the computer systems; and
- generating information that indicates that the actual launch time is not in accordance with the SLA, using the one or more processors of the computer systems.

5. The computer implemented method of claim 4, further comprising sending the information to a system administrator.

6. The computer implemented method of claim 4, further comprising providing additional information related to at least one of: a type of computing instance that is launched in the computing service environment, the selected physical host in the computing service environment on which the computing instance is launched, or a type of data store used when launching the computing instance in the computing service environment.

7. The computer implemented method of claim 4, wherein the launch time prediction model is a machine learning model that determines the predicted launch time for launching the computing instance in the computing service environment based in part on instance features associated with the computing instance and physical host features associated with the selected physical host in the computing service environment.

8. The computer implemented method of claim 4, further comprising identifying the actual launch time for launching the computing instance in response to loading the computing instance on the selected physical host in the computing service environment.

9. The computer implemented method of claim 4, wherein the launch time prediction model is a regression model that determines the predicted launch time for launching the computing instance using historical information related to previously launched computing instances in the computing service environment.

10. The computer implemented method of claim 4, wherein the launch time prediction model uses, in part, instance features associated with the computing instance to be launched according to the launch plan and physical host features associated with the selected physical host in order to determine the predicted launch time for launching the computing instance.

11. The computer implemented method of claim 4, wherein the SLA is based at least in part on the predicted launch time for launching the computing instance.

12. The computer implemented method of claim 4, wherein the acceptable launch times for launching the computing instance are set to be within the predicted launch time.

13. The computer implemented method of claim 4, further comprising providing a notification to a customer when the actual launch time for launching the computing instance is in accordance with the SLA or is not in accordance with the SLA.

14. A system for monitoring computing instance launch times, comprising:
- a processor;
- a memory device including instructions that, when executed by the processor, cause the system to:
- identify a computing instance to launch in a computing service environment;
- determine, using a launch time prediction model, a predicted launch time for launching the computing instance on a selected physical host in the computing service environment;
- generate a service level agreement (SLA) that defines acceptable launch times for launching the computing instance in the computing service environment based in part on the predicted launch time;
- determine that an actual launch time for launching the computing instance in the computing service environment is not in accordance with the acceptable launch times defined in the SLA; and
- generate an alert to indicate that the actual launch time for launching the computing instance in the computing service environment is not in accordance with the SLA.

15. The system of claim 14, wherein the memory device including instructions that, when executed by the processor, cause the system to provide the alert to a system administrator indicating potential service failures in the computing service environment.

16. The system of claim 14, wherein the memory device including instructions that, when executed by the processor, cause the system to determine the predicted launch time using a regression model that determines predicted launch times based at least in part on historical information related to previously launched computing instances in the computing service environment.

17. The system of claim 14, wherein the memory device including instructions that, when executed by the processor, cause the system to identify the actual launch time for launching the computing instance in response to executing the computing instance on the selected physical host in the computing service environment.

18. The system of claim 14, wherein the memory device including instructions that, when executed by the processor, cause the system to determine the predicted launch time based in part on instance features associated with the computing instance and physical host features associated with the selected physical host in the computing service environment.

* * * * *